United States Patent
Fjeldsoe-Nielsen (10) Patent No.: US 9,615,208 B2
(45) Date of Patent: Apr. 4, 2017

(54) DYNAMICALLY CONTROLLING THE PRESENTATION OF A GRAPHIC FEATURE BASED ON LOCATION INFORMATION

(71) Applicant: Uber Technologies, Inc., San Francisco, CA (US)

(72) Inventor: Lars Fjeldsoe-Nielsen, Los Altos, CA (US)

(73) Assignee: Uber Technologies, Inc., San Francisco, CA (US)

( * ) Notice: Subject to any disclaimer, the term of this patent is extended or adjusted under 35 U.S.C. 154(b) by 26 days.

(21) Appl. No.: 14/536,054

(22) Filed: Nov. 7, 2014

(65) Prior Publication Data
US 2016/0135006 A1 May 12, 2016

(51) Int. Cl.
*H04W 4/02* (2009.01)
*H04B 1/3827* (2015.01)

(52) U.S. Cl.
CPC .......... *H04W 4/023* (2013.01); *H04B 1/3827* (2013.01)

(58) Field of Classification Search
CPC ............................ H04W 4/023; H04B 1/3827
See application file for complete search history.

(56) References Cited

U.S. PATENT DOCUMENTS

| | | | |
|---|---|---|---|
| 8,311,875 | B1 | 11/2012 | Lloyd |
| 9,485,647 | B2 | 11/2016 | Mohebbi |
| 2002/0138338 | A1 | 9/2002 | Trauth |
| 2006/0056023 | A1 | 3/2006 | Malfait |
| 2009/0248587 | A1 | 10/2009 | Van Buskirk |
| 2010/0153279 | A1 | 6/2010 | Zahn |
| 2011/0099040 | A1 | 4/2011 | Felt |
| 2012/0089974 | A1* | 4/2012 | Cho .......................... G06F 8/61 717/173 |
| 2012/0149312 | A1* | 6/2012 | Velusamy ......... H04M 1/72569 455/68 |
| 2014/0026065 | A1 | 1/2014 | Wang |
| 2014/0378118 | A1 | 12/2014 | Mohebbi |
| 2016/0082581 | A1 | 3/2016 | Lai |

FOREIGN PATENT DOCUMENTS

| | | |
|---|---|---|
| JP | 2009-146300 | 7/2009 |
| WO | WO 2014-000141 | 1/2014 |

OTHER PUBLICATIONS

International Search Report in PCT/US2016/043017 dated Oct. 27, 2016.

\* cited by examiner

*Primary Examiner* — Chuong A Ngo
(74) *Attorney, Agent, or Firm* — Mahamed IP Law LLP (57) ABSTRACT

A system and method of operating a mobile device is described. The mobile device can determine its current location and determine whether a location-based service, which can be requested by a user operating the mobile device, is available for use at the current location. In response to determining that the location-based service is unavailable for use at the current location, the mobile device can cause a graphic icon, that would otherwise be displayed one of one or more home pages on a display of the mobile device, to be hidden so that the graphic icon is not displayed with any of the one or more home pages. The graphic icon can correspond to a service application for use with the location-based service.

20 Claims, 8 Drawing Sheets

DYNAMICALLY CONTROLLING THE PRESENTATION OF A GRAPHIC FEATURE BASED ON LOCATION INFORMATION

BACKGROUND

An on-demand service arrangement system can arrange an on-demand service to be performed by a service provider for a requesting user through the use of computing devices. However, due to a variety of different factors, such an on-demand service may only be available to be requested by users that are located in certain locations.

DETAILED DESCRIPTION

Examples described herein provide for a system to determine a current location of a mobile computing device and based on the current location, dynamically control the presentation of a graphic icon of an application. Such a system, for example, can be implemented using hardware and processing resources of a mobile computing device, such as a smartphone. The system can determine, based on the current location of the mobile computing device (and/or other conditions), that an application should not be made available for use by a user of the mobile computing device, and in response, can cause a corresponding graphic icon to be hidden from view of the user on the home page of the mobile computing device. In this manner, the user can be prevented from launching or accessing the application when operating the mobile computing device at a particular location.

According to an example, the system can determine the current location of the mobile computing device. The current location can be determined by using at least a global positioning system (GPS) receiver of the mobile computing device or a transceiver of the mobile computing device. Based on the current location, the system can determine whether a location-based service (which can be requested by a user operating the mobile computing device) is available for use at the current location. If the location-based service is unavailable for use at the current location, the system can cause a graphic icon, that corresponds to a service application for use with the location-based service and that would otherwise be displayed on or as part of a home page(s) on a display of the mobile computing device, to be hidden from view so that the graphic icon is not displayed with any of the home page(s). On the other hand, if the location-based service is available for use at the current location, the system can cause the graphic icon corresponding to the service application to be displayed on the home page(s) so that the user may, if he or she chooses to, select the graphic icon to launch and access the service application. Accordingly, the system can dynamically alter the graphical user interface that is to be displayed on a display of the mobile computing device based on location information.

As described herein, a mobile computing device can store a service application in a memory resource of the mobile computing device. In one example, the service application (e.g., the set of instructions and data corresponding to the service application) can be pre-installed or pre-stored in the mobile computing device during or after the manufacturing and device packaging process, but before the mobile computing device is purchased by a user. In such an example, the system can perform the operations described above in response to detecting a triggering event, such as the mobile computing device being powered on from an off state or a power-saving state or the mobile computing device changing operational states or modes. For example, instructions stored as part of the set of instructions can cause the processor of the mobile computing device to perform the operations described above in response to the operating system of the mobile computing device being initiated as a result of a boot-up process (e.g., after the user powers on the device for the first time after purchasing the device or after the user resets the device).

In another example, the system operating on the mobile computing device can execute the instructions in response to the operating system activating a transceiver of the mobile computing device. A mobile computing device can include one or more transceivers, such as a cellular transceiver to exchange data with a cellular network(s) or a short-range transceiver (e.g., a Bluetooth radio, a wireless local area network (WLAN) device, etc.). In certain situations, depending on whether a transceiver is turned off or depending on the availability or quality of service of a cellular or wireless (e.g., Wi-Fi) network, the mobile computing device may operate in different operational states or modes. When the system detects a change in the operational state or mode (e.g., detects a triggering event), the system can be triggered to perform the operations described above.

Still further, depending on implementation, the system can determine the current location of the mobile computing device using one or more different resources. In one example, the system can determine the current location by receiving location information from the GPS receiver or a transceiver of the mobile computing device. In another example, the system can determine the current location by receiving location information from another application that is operating on the mobile computing device. Because other applications may have previously determined the current location by receiving location information from the GPS receiver or the transceiver, the system can leverage the information already determined by another application without again having to access the GPS receiver or the transceiver.

As used herein, a client device, a computing device, and/or a mobile computing device refer to devices corresponding to desktop computers, cellular devices or smartphones, personal digital assistants (PDAs), laptop computers, tablet devices, etc., that can provide network connectivity and processing resources for communicating with the system over one or more networks. Client devices and service provider devices can each operate a designated service application (e.g., a client application and a service provider application, respectively) that is configured to communicate with a location-based (and/or an on-demand) service arrangement system.

Still further, examples described herein relate to a variety of location-based (and/or on-demand) services, such as a transport service, a food truck service, a delivery service, an entertainment service, etc. to be arranged between users and service providers. In other examples, the system can be implemented by any entity that provides goods or services for purchase through the use of computing devices and network(s). For purpose of simplicity, in examples described herein, the location-based service arrangement system can correspond to a transport arrangement system that arranges transport services to be provided for users by drivers of vehicles.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
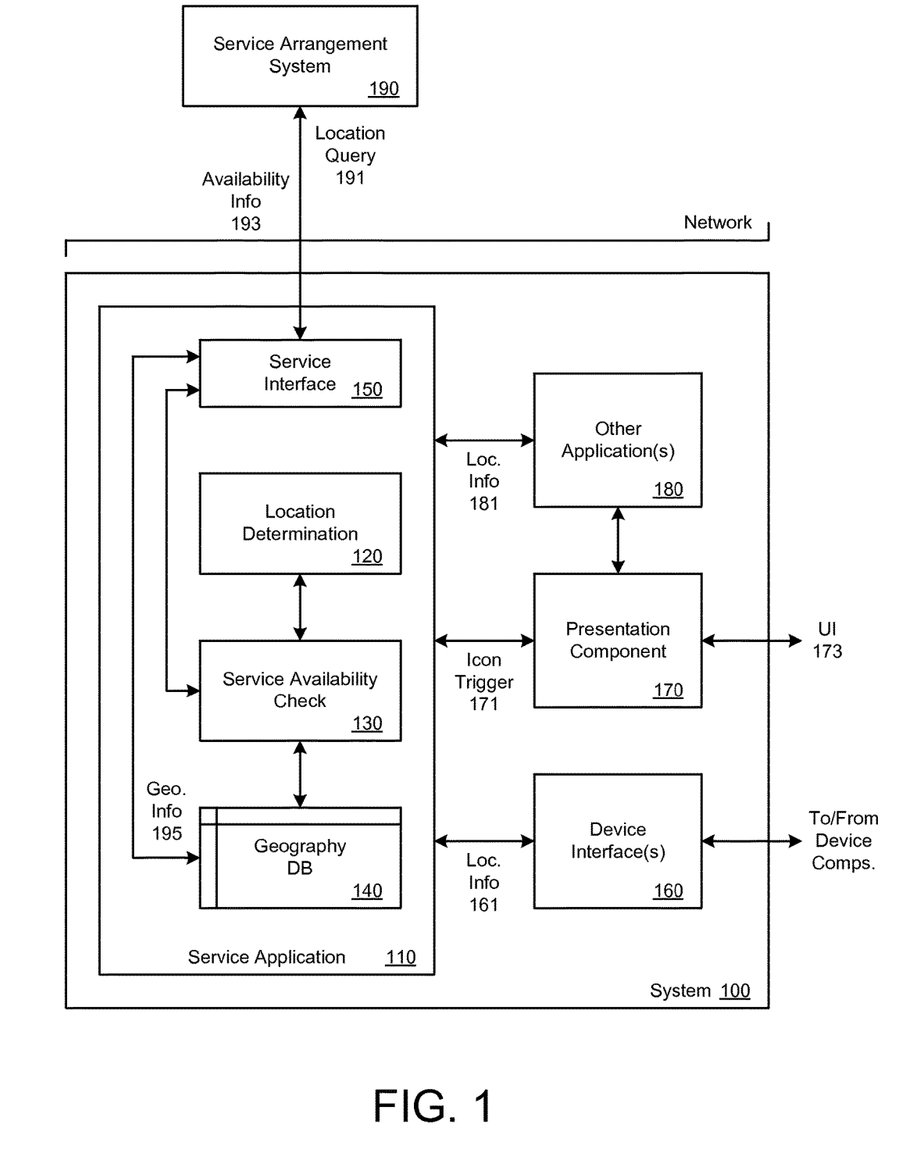
FIG. 1 illustrates an example system to dynamically control the presentation of a graphic feature based on location information.

FIG. 1 illustrates an example system to dynamically control the presentation of a graphic feature based on location information. According to an example of FIG. 1, the system 100 can be implemented by and operated on a mobile computing device, such as a smartphone, through execution of instructions stored in one or more memory resources of the mobile computing device. The system 100 can include a service application 110, other applications 180, a presentation component 170, and one or more device interfaces 160 to communicate with mobile computing device components (e.g., one or more transceivers, a GPS receiver, etc.). For purpose of simplicity, other data, information, and components for controlling and running the mobile computing device are not illustrated in FIG. 1. The components of the system 100 can combine to determine the current location or position of the mobile computing device and dynamically display or hide a graphic icon of the service application 110 based on the current location. Logic can be implemented with various applications (e.g., software) and/or with hardware of the computing device that implements the system 100.

As described herein, the service application 110 can correspond to a program that is downloaded onto the mobile computing device. In one example, the service application 110 can be pre-installed or pre-stored on the mobile computing device before sale of the mobile computing device (e.g., before the device is turned on for the first time by a user who purchased the device). In other examples, the service application 110 can be downloaded onto the mobile computing device in response to the user accessing an application source (e.g., an online store) from the mobile computing device. The service application 110 can also be configured to communicate with a location-based (and/or on-demand) service arrangement system, such as the service arrangement system 190, over one or more networks. Such a service arrangement system 190 can be implemented on network side resources, such as on one or more servers or data centers. The service arrangement system 190 can also be implemented through other computer systems in alternative architectures (e.g., peer-to-peer networks, etc.).

When operated by a user of the mobile computing device, the service application 110 can enable the user to make a request for a location-based service, such as an on-demand transport service or a food/goods delivery service, using the mobile computing device. The service arrangement system 190 can receive a request for the location-based service and arrange the location-based service by selecting a service provider from a plurality of available service providers to provide the location-based service for the requesting user based, at least in part, on location information (e.g., a current location, a pickup location, a delivery location specified by a user, etc.). The service arrangement system 190 can then provide information about the arranged location-based service to the service application 110 and monitor the progress of the arranged location-based service.

According to other examples, the service application 110 can correspond to an application that is operated by a service provider (e.g., a driver, a food delivery individual, etc.). The service application 110 can be configured to communicate with the service arrangement system 190 and can enable the driver, for example, to receive an invitation to provide a location-based service for a requesting user. The service application 110 can be implemented on a mobile computing device that is in control and operated by the service provider. In another example, the service application 110 can be implemented on a vehicle computer, such as one that is built in with a vehicle driven by the service provider.

In some examples, the service application 110 can include a location determination 120, a service availability check 130, a geography database 140, and a service interface 150. The service application 110 can also include other data, such as content to be displayed as user interface features for the service application 110 and a graphic icon corresponding to the service application 110 to be displayed on a home page (e.g., user interface) or an application launch page of the mobile computing device. For purpose of simplicity, other information and components of the service application 110 are not illustrated in FIG. 1. The service interface 150 enables the service application 110 to exchange data between the service application 110 and the service arrangement system 190. For example, the service interface 150 can use one or more network resources of the mobile computing device to exchange communications over a wireless network (e.g., a cellular transceiver, a WLAN transceiver, etc.). The service interface 150 can include or use an application programming interface (API), such as an externally facing API, to communicate data with the service arrangement system 190. The externally facing API can provide access to the service arrangement system 190 via secure access channels over the network through any number of methods, such as web-based forms, programmatic access via restful APIs, Simple Object Access Protocol (SOAP), remote procedure call (RPC), scripting access, etc.

According to an example, the system 100 can be initiated or activated when the mobile computing device is powered on from an off state or a power-saving state (e.g., a suspended or sleep state). The system 100 can correspond to, can be a part of, and/or can include the operating system of the mobile computing device. For example, when the mobile computing device is powered on, a boot-up process can be initiated in which a boot loader (e.g., a boot-up program) launches and loads a kernel, which can run and turn on device drivers, and turn on the operating system of the mobile computing device. As referred to herein, in one example, a boot-up process can correspond to the operations performed by the mobile computing device from a time when the device is powered on to a time the mobile computing device is ready for use by a user, such as, for example, when the unlock user interface (e.g., a user interface in which the user can unlock the mobile computing device via input) and/or the home page (e.g., an application launch page) is displayed on the display of the mobile computing device.

As part of the boot-up process, the system 100 can identify one or more applications (or portions of one or more applications) that it is to automatically run or operate, such as one or more pre-installed applications or native applications (e.g., applications that have been developed for use on the particular operating system or mobile computing device), and can launch and operate the identified applications (or portions of the identified applications). In the example of FIG. 1, the system 100 can determine that portions of the service application 110 is to be automatically executed as part of the boot-up process (e.g., the location determination 120 and the service availability check 130).

In one example, in response to the operating system being initiated on the mobile computing device, the system 100 can automatically execute instructions corresponding to the location determination 120 and/or instructions corresponding to the service availability check 130 (e.g., as part of the boot-up process). The location determination 120 can determine the current location of the mobile computing device.

Depending on implementation, in one example, the location determination 120 can determine the current location by communicating with one or more other applications 180 that are operated or being operated on the mobile computing device (e.g., via an API) to receive location information 181 corresponding to the current location from the one or more other applications 180. For example, as part of the boot-up process, the system 100 may have run a second application (e.g., a native weather application or a map application) that determined the current location of the mobile computing device for use by that second application by receiving location information from the GPS receiver or the transceiver of the mobile computing device.

According to another example, the location determination 120 can determine the current location of the mobile computing device by communicating with one or more mobile computing device components (e.g., a GPS receiver, a cellular transceiver, a short-range transceiver) via a corresponding device interface 160 to receive location information 161 corresponding to the current location. For example, the cellular transceiver of the mobile computing device can determine the current location by communicating with a plurality of cellular towers or base stations (e.g., through triangulation).

In another variation, the short-range transceiver of the mobile computing device (e.g., in combination with processing resources of the mobile computing device) can determine the current location by communicating with a network (e.g., the internet, a WLAN), and using geolocation processes, can determine the current location based on an internet protocol (IP) address of the network and/or the device (and/or based on other information, such as the media access control (MAC) address of the network and/or the device). For example, based on the IP address of the network, the system 100 can use a database provided by an internet registry to determine a zip code, a city, a county, a state, etc. Depending on implementation, the current location of the mobile computing device can correspond to a latitude and a longitude coordinate, or a less-accurate general location, such as a city block, a city, a county, a state, etc. Such a less-accurate general location (as opposed to a more-accurate location data point) can be sufficient for purpose of determining service availability.

The service availability check 130 can determine whether a location-based service (e.g., one that can be requested by the user using the service application 110) is available for use at the current location of the mobile computing device. Such a location-based service may be available in certain geographic regions and may be unavailable in other geographic regions. For example, with reference to an on-demand transport service (e.g., one that can be arranged by the service arrangement system 190), service providers (e.g., drivers of vehicles) may only be available to provide transport services in certain cities, counties, or regions. In another example, for a food delivery service, users may only be able to request food delivery if the drop off location is in a particular city, county, or region.

According to an example, the service availability check 130 can access the geography database 140 stored with the service application 140 to determine whether the location-based service is available at the current location. The geography database 140 can store information about one or more predetermined geographic regions that correspond to an area where the location-based service associated with the service application 110 is available (e.g., can be requested by the user by operating the mobile computing device). A predetermined geographic region can be identified by a city name, a county name, a state name, etc., and/or can be defined by three or more location data points (e.g., a latitude and a longitude coordinate) that make up a perimeter of the geographic region. If the current location is located within a geographic region in which the location-based service is available, the service availability check 130 can determine that the location-based service is available for use at the current location. On the other hand, if the current location is not located within any of the geographic region(s) in which the location-based service is available, the service availability check 130 can determine that the location-based service is unavailable for use at the current location, and thereby determine that the service application 110 should not be made available for use by the user of the mobile computing device.

In such case, the service availability check 130 can communicate with the presentation component 170 to cause a graphic icon corresponding to the service application 110, that would otherwise be displayed on a home page or an application launch page, to be hidden from the user's view. For example, the presentation component 170 can determine which applications 180 are installed on the mobile computing device. For a set of applications that can be launched and operated by the user of the mobile computing device, the presentation component 170 can typically display a graphic icon for each of the set of applications to be presented on or as part of a user interface 173, such as a home page or an application launch page. Each of the graphic icons can be individually selectable (by the user) to launch or open a corresponding application. In the example of FIG. 1, however, despite the service application 110 being stored on the mobile computing device and having an associated graphic icon, if the service availability check 130 determines that the location-based service is unavailable for use at the current location, the service availability check 130 can cause, via an icon trigger command or message 171, the graphic icon corresponding to the service application 110 to be hidden from being displayed on the home page.

As an addition or an alternative, in another example, the service availability check 130 can communicate with the service arrangement system 190 via the service interface 150, provided that the mobile computing device is network-enabled and capable of communicating with the service arrangement system 190. In this example, the service availability check 130 can transmit a location query 191 using the current location of the mobile computing device to the service arrangement system 190 to determine if the location-based service is available at the current location. The service arrangement system 190 can provide availability information 193 to the service availability check 130 (e.g., available or unavailable at the current location) by accessing its database of predetermined geographic region(s) in which the location-based service is available. Based on the availability information 193, the service availability check 130 can cause, via an icon trigger command 171, the presentation component 170 from displaying or hiding the graphic icon corresponding to the service application 110 on the home page. In this example, the service arrangement system 190 can connect or communicate with the service application 110 to dynamically control the presentation of the graphic icon on the mobile computing device.

Although FIG. 1 is described with the system 100 executing the instructions for the location determination 120 and the instructions for the service availability check 130 in response to the mobile computing device being powered on or in response to the operating system being initiated on the mobile computing device, in other examples, the components of the service application 110 can be run by the system 100 in response to other triggering events. Other triggering events can include, for example, detecting a change in an operational state of the mobile computing device, receiving a specific triggering communication from the service arrangement system 190 over one or more networks, or receiving a user input (e.g., input when the user presses an input mechanism or turns on the display of the mobile device). For example, a user can operate the mobile computing device in a particular operational state, such as in a state where the cellular transceiver is operational, but the short-range transceiver(s) is turned off (e.g., the Wi-Fi transceiver and/or Bluetooth transceiver is turned off, or the programmatic components that communicate with such a transceiver are disabled), in a state where the cellular transceiver is turned off (e.g., also known as "airplane mode"), in a state where the GPS receiver is turned off, etc. When the mobile computing device changes operational states from a previous state to a current state (e.g., the user changes the operational state by changing a setting on the mobile computing device), the system 100 can execute the instructions for the location determination 120 and the instructions for the service availability check 130.

In another example, the mobile computing device can operate in a particular operational state and automatically change states based on real-time conditions (e.g., without user input). Depending on cellular service provider settings, signal quality, or presence (or lack thereof) of cellular towers or base stations, for example, the mobile computing device can operate in any one of many different operational states (e.g., a 4G cellular state, a 3G cellular state, an LTE cellular state, a roaming state, no cellular service state, etc.). When the user moves and changes positions, the mobile computing device may also change operational states. In such examples, the system 100 can detect the change in operational states and in response, can execute the instructions for the location determination 120 and the instructions for the service availability check 130.

Still further, in one variation, the triggering event can correspond to the system 100 detecting a change from a first operational state to a second operational after the mobile computing device has operated in the first operational state for a predetermined amount of time (e.g., thirty minutes, one hour, etc.). For example, the user may be in a region where little or no cellular service is available for at least a predetermined amount of time. When the user travels to a different location and the mobile computing device changes operational states, e.g., from a no cellular service state to a 4G or LTE cellular state, the system 100 can detect the change in operational states and in response, execute the instructions for the location determination 120 and the instructions for the service availability check 130. In the examples described, depending on implementation, in response to detecting a triggering event, the system 100 can dynamically cause the graphic icon corresponding to the service application 110 to be displayed on or removed from the home page based on the current location of the mobile computing device (e.g., the graphic icon can be hidden at a one instance in time, while being displayed at another instance in time, or vice versa).

As an addition or an alternative, according to one example, the service arrangement system 190 can update the geography database 140 of the service application 110 by providing updated geography information 195 via the service interface 150. An entity that operates the service arrangement system 190 can expand the availability of the location-based services to different locations (e.g., make the location-based service available for a user to request in a new city in which the location-based service was previously unavailable) and/or remove location-based services from previously available locations. The service arrangement system 190 can manage, update, and store a master geography database of all locations and regions in which the location-based service is available (e.g., similar to the geography database 140 of the service application 110). Because the information in the geography database 140 may be outdated, the service arrangement system 190 can periodically, or in response to updating its own master geography database, provide updated geography information 195 of locations where the location-based service is available to the service application 110 (e.g., changes to the availability information between the master geography database and the geography database 140). In another example, the service arrangement system 190 can provide the updated geography information 195, if any, to the service application 110 each time the service application 110 (or portions thereof) is launched or executed.

In this manner, if the user is in a location where the user would be unable to use the service application 110 to request a location-based service, the system 100 can automatically cause the graphic icon corresponding to the service application 110 to be hidden so that the graphic icon is not displayed on a home page of the system 100. The user can be automatically made aware that the location-based service is unavailable at the current location without the user having to launch or open the service application 110. On the other hand, if the user is in a location where the user can use the service application 110 to request a location-based service, the system 100 can automatically cause the graphic icon to be displayed on the home page of the system 100.

Figure 2:
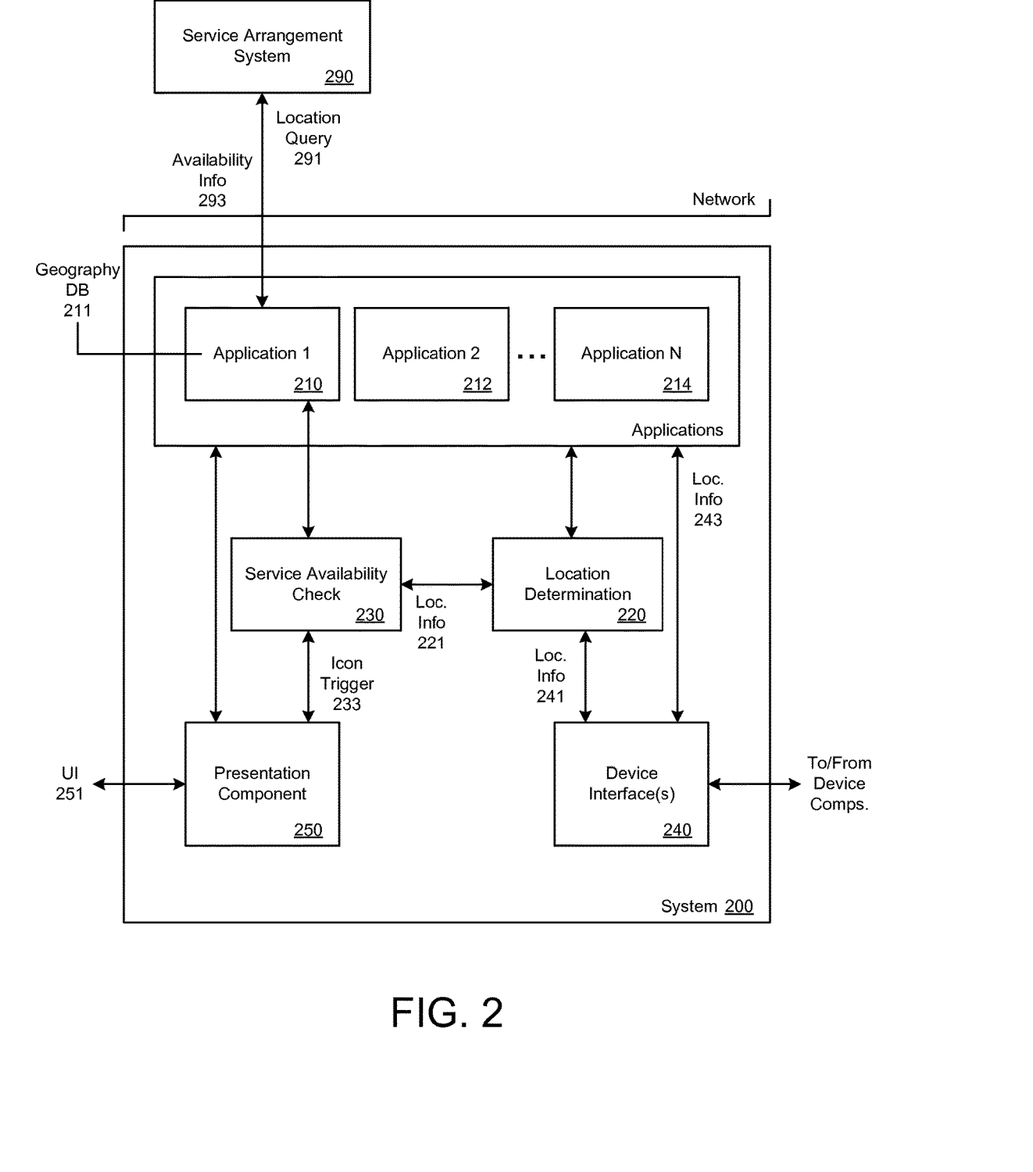
FIG. 2 illustrates another example system to dynamically control the presentation of a graphic feature based on location information.

FIG. 2 illustrates another example system to dynamically control the presentation of a graphic feature based on location information. A system 200 can be implemented by and operated on a mobile computing device through execution of instructions stored in one or more memory resources of the mobile computing device. The system 200 in FIG. 2 can be similar to the system 100 in FIG. 1, except that in the example of FIG. 2, a location determination 220 and a service availability check 230 can be components of the system 200 as opposed to being components of the service application 110 of FIG. 1. For example, the instructions corresponding to the location determination 220 and the instructions corresponding to the service availability check 230 can be a part of a set of instructions corresponding to the operating system of the mobile computing device (and/or other programmatic components for operating the mobile computing device).

The system 200 can also include a plurality of applications, such as Application 1 210, Application 2 212, Application N 214, etc., one or more device interfaces 240 (such as described with respect to FIG. 1), and a presentation component 250 (such as described with respect to FIG. 1). The plurality of applications can include native applications, such as described with respect to FIG. 1, and can include a designated service application that is used to communicate with a service arrangement system, such as described in FIG. 1. For example, Application 1 210 can correspond to a service application that is configured to communicate with a location-based service arrangement system, such as the service arrangement system 290, over one or more networks. Application 1 210, when operated by a user of the mobile computing device, can enable the user to request a location-based service (such as a transport service, a delivery service, a food-ordering service, etc.) in connection with the service arrangement system 290, provided that the location-based service is available for use at a particular location or region.

The system 200 can operate the location determination 220 and then the service availability check 230 in response to detecting one or more triggering events, such as described with respect to FIG. 1. For example, a triggering event can correspond to the mobile computing device being powered on from an off state or a power-saving state or can correspond to the operating system being initiated on the mobile computing device. In response to detecting a triggering event, the location determination 220 can determine the current location of the mobile computing device by using or accessing one or more resources of the mobile computing device. Depending on implementation, the location determination 220 can receive location information 241 corresponding to the current location from one or more transceivers of the mobile computing device and/or from a GPS receiver of the mobile computing device via the one or more device interfaces 240. In another example, an application (e.g., Application 2, which corresponds to a native location-based application, such as a weather application) may have determined the current location of the mobile computing device by receiving the location information 243 corresponding to the current location from a transceiver or a GPS receiver of the mobile computing device. The location determination 220 can determine the current location by communicating with and receiving the location information 243 from that application.

The location determination 220 can provide the location information 221 of the determined current location to the service availability check 230. The service availability check 230 can use the location information 221 to determine whether a location-based service, which can be requested by the user using Application 1, is available for the user to request at the current location. According to one example, the service availability check 230 can access (e.g., search) the geography database 211 of Application 1 to determine if the current location corresponds to or is within a location or geographic region in which the location-based service is available for use. Such a geography database 211 can be identical or similar to the geography database 140 as described in FIG. 1.

In another example, the service availability check 230 can use resources of Application 1 to determine whether the location-based service is available for the user to request at the current location. The service availability check 230 can cause Application 1 to communicate with the service arrangement system 290 over one or more networks using preconfigured communication mechanisms. Application 1 can transmit a location query 291 using the location information 221 of the current location. The location query 291 can request the service arrangement system 290 to check its internal or accessible geography database to determine whether the current location corresponds to or is within a location or geographic region in which the location-based service is available for use. Application 1 can receive availability information 293, about whether the location-based service is available or not, from the service arrangement system 290, and provide the availability information 293 to the service availability check 230.

Depending on implementation, the service availability check 230 can be pre-programmed to check one or more applications for location-based service availability (e.g., sequentially or concurrently). In one example, the service availability check 230 can be instructed to check any application that is identified or tagged as being a location-based application (e.g., one that uses location information) or is identified as being an application whose operation is associated with a location or with a particular language associated with a geographic region. In another example, the service availability check 230 can include a list or database identifying one or more specific applications to check for service availability.

Based on the determination of whether the location-based service is available or unavailable at the current location, the service availability check 230 can instruct the presentation component 250 to display or hide the graphic icon of the corresponding application, respectively. The service availability check 230 can provide an icon trigger message 233 to the presentation component 250 to cause the presentation component 250 to dynamically display or hide the graphic icon of Application 1. For example, if the location-based service is available for use at the current location, the presentation component 250 can be caused to display the graphic icon for Application 1. Such a graphic icon can be displayed with a home page user interface 251 so that the user can select the graphic icon to run and operate Application 1. On the other hand, if the location-based service is unavailable for use at the current location, the presentation component 250 can be caused to hide the graphic icon so that the home page user interface 251 can be displayed without the graphic icon.

While examples described with respect to FIG. 2 refer to the system 200 executing the instructions for the location determination 220 and the instructions for the service availability check 230 in response to detecting a triggering event, in other examples, as an addition or an alternative, the system 200 can execute the instructions for the location determination 220 and the instructions for the service availability check 230 periodically.

Use Case Examples

For illustrative purposes, a variety of use case examples are described with respect to FIG. 1 and/or FIG. 2. In one example, the system 100 and/or the system 200 can also provide a notification that is displayed on the display of the mobile computing device when the graphic icon corresponding to the service application is to be displayed from a previous hidden state, or hidden from a previous displayed state. Such a notification can inform the user that the location-based service is unavailable or available when such a change is determined by the service application check 130 or the service application check 230. According to some examples, the notification that is displayed when the graphic icon is displayed (or is to be displayed) can also include promotional content that enables the user to receive a cost-benefit with regards to the location-based service (e.g., a promotional code or text string).

In another example, the service arrangement system can store information about individual different locations/regions in which the location-based service is available along with a time parameter in a geography database (e.g., the master geography database and/or the geography database in the service application). Such a time parameter can correspond to a starting instance in time (e.g., a date and/or a time) or a duration of time (e.g., six months) in which a location-based service is available at a particular location or geographic region. For example, the location-based service may not yet be available at a particular city at a current instance in time, but may be available at a later time (e.g., may be available three months later). The entity that implements and controls the service arrangement system may plan on the location-based service to be available at different locations in the future. A geography database associated with the service application can include availability information about a particular location or region along with time information. In such an example, the service application check 130 or the service application check 230 can determine if the current location is at an available location or within an available region and can also determine if the current time corresponds to a time when the location-based service is available. If the user is operating in a location where the location-based service is not yet available, but will be available, the system 100 and/or the system 200 can hide the graphic icon corresponding to the service application until a time when the location-based service becomes available. Once that time passes, the next time the location determination 120, 220 and the service availability check 130, 230 is executed, the system 100 and/or the system 200 can cause the graphic icon to be displayed on the home page.

In an example in which the system 100 and/or the system 200 is implemented on a service provider's mobile computing device or on a vehicle computer device (and the service application is pre-stored or pre-installed on such device), the system 100 and/or the system 200 can operate to determine the current location of the mobile computing device and to determine whether the location-based service is available at the current location. Availability for a service provider can be correspond to whether the service provider can receive invitations for providing location-based services from the service arrangement system at the current location. For example, due to regulations or due to business reasons, a location-based service may not be allowed or available in a particular city, so that when a service provider is in the particular city, the service provider may not receive invitations from the service arrangement system. In such case, if the system 100 and/or the system 200 determines that the location-based service is unavailable for the service provider at the current location, the system 100 and/or the system 200 can cause the graphic icon corresponding to the service application to be hidden from being displayed on the home page of the device.

As an addition or an alternative, the system 100 and/or the system 200 can communicate with the service arrangement system and receive position information of those users operating the user service applications on their respective devices within a predetermined distance from the current location of the service provider. If no users are operating the user service applications within the predetermined distance, the system 100 and/or the system 200 can cause the graphic icon corresponding to the service application to be hidden from display or cause the graphic icon to be inoperable (e.g., so that the service provider cannot select the graphic icon to launch the service application).

According to another use case example, the service application can enable a user to order and purchase goods, such as food or merchandise, for pickup at or delivery from a particular restaurant or store. The service application can store a geography database that stores information about restaurant or store locations, and/or communicate with the corresponding service arrangement system that stores such information. The system 100 and/or the system 200 can determine the current location of the mobile computing device (e.g., periodically, or in response to a triggering event), and can determine whether a physical location of a restaurant or store associated with the service arrangement system is within a predetermined distance of or predetermined travel time from the current location. If there restaurant or store is not within the predetermined distance (e.g., twenty miles) of the current location of the user, the system 100 and/or the system 200 can hide the graphic icon corresponding to the service application.

Depending on implementation, in other examples, the service arrangement system can also dynamically cause the system 100 and/or the system 200 to display or hide the graphic icon corresponding to the service application by transmitting control signals over the one or more networks. For example, in some instances, the service arrangement system may want to prevent a group of users, such as a group of users in a particular location, from being able to make a request for the location-based system. In such case, the service arrangement system can access a user database and identify users that last used the service application in a particular geographic region. Using the mobile device identifier (ID) or user ID of the individual identified users in the group, the service arrangement system can transmit a command to cause the respective service applications to hide the corresponding graphic icon from being displayed on the home page of the mobile computing device.

Still further, in one example, a service application can interface with another application (e.g., a native weather application) stored on the mobile computing device or can be integrated with, at least in part, another application. As an addition or an alternative, the native application can also interface with the service arrangement system (e.g., via a software development kit or API). A native weather application, for example, can be launched or operated (e.g., automatically launched as part of the boot-up process) by the system 100 and/or the system 200. After being launched or as part of the process of being launched, the weather application can communicate with a GPS receiver or a transceiver to determine the current location of the mobile computing device. In one use case example, the weather application can communicate information about the current location to the service arrangement system to determine whether the location-based service is available at the current location. The weather application can then cause the system 100 and/or the system 200 to hide the graphic icon corresponding to the service application from being displayed on the home page if the location-based service is unavailable at the current location. In one variation, the weather application can cause the system 100 and/or the system 200 to uninstall or delete the service application. If the location-based service is available at the current location, the weather application can cause the graphic icon to be displayed on the home page.

Methodology

Figure 3A:
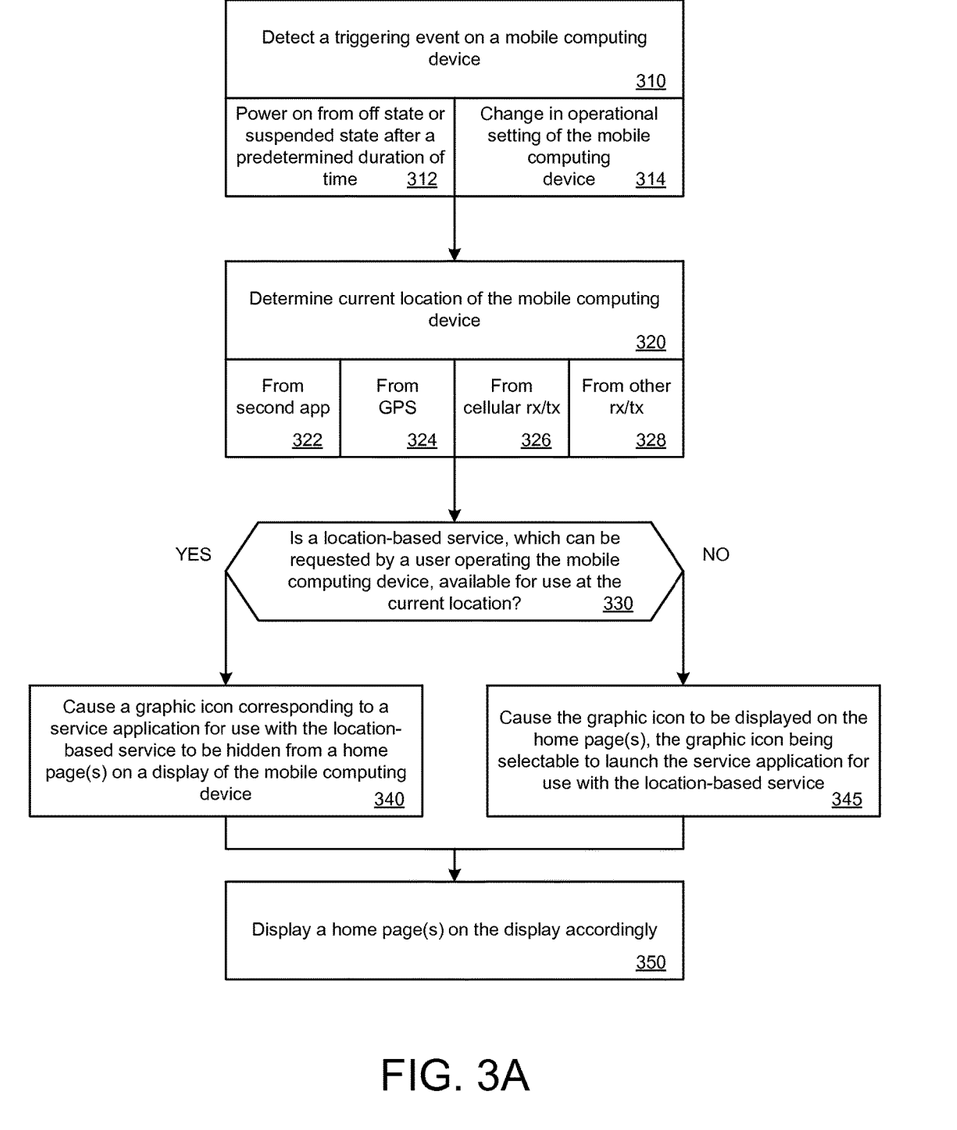
FIGS. 3A and 3B illustrate example methods for dynamically controlling the presentation of a graphic feature based on location information.

FIG. 3A illustrates an example method for dynamically controlling the presentation of a graphic feature based on location information. A method such as described by an example of FIG. 3A can be implemented using, for example, components described with an embodiment of FIG. 1 or an embodiment of FIG. 2. Accordingly, references made to elements of FIG. 1 or FIG. 2 are for purposes of illustrating a suitable element or component for performing a step or sub-step being described.

In the example of FIG. 3A, a service application, such as described with respect to FIGS. 1 and 2, can be stored (e.g., pre-stored or pre-installed) in a memory of the mobile computing device. Referring to FIG. 3A, a system that is implemented on a mobile computing device can detect a triggering event on the mobile computing device (310). The triggering event can correspond to, for example, the mobile computing device being powered on from an off state or a suspended state, or being powered on from a suspended state after the device has been in the suspended state for a predetermined duration of time (312). In another example, the triggering event can correspond to a change in an operational setting of the mobile computing device (314). The change can be an automatic change as a result of current conditions or can be a change in response to user input.

In response to detecting a triggering event, the system can determine the current location of the mobile computing device (320). In the example in which the triggering event corresponds to the mobile computing device being powered on (e.g., for the first time by the user after purchasing the device), the system can be initiated as part of a boot-up process. As part of the boot-up process, the operating system of the mobile computing device can be initiated. The system can execute instructions to determine the current location of the mobile computing device. Depending on implementation, the instructions can be a part of a set of instructions corresponding to the operating system or can be a part of a set of instructions corresponding to a service application associated with a service arrangement system.

The system can determine the current location of the mobile computing device using one or more different resources or operations. For example, the system can determine the current location by communicating with another application that is operated on the mobile computing device (322). In such an example, a native application of the mobile computing device can be executed to determine the current location of the mobile computing device for use with the native application. The service application, for example, can interface with the native application to determine the current location without having to make a call to one or more resources of the mobile computing device. In another example, the system can determine the current location by communicating with a GPS receiver of the mobile computing device (324), by communicating with a cellular transceiver or radio of the mobile computing device (326), or by communicating with another transceiver, such as a short-range wireless transceiver, of the mobile computing device (328). For example, a WLAN transceiver can determine the current location using Wi-Fi triangulation methods. In another example, the system can determine the current location using magnetic field data as fingerprints for localization (e.g., in conjunction with using other resources of the mobile computing device). The current location can correspond to a location data point (e.g., a latitude and a longitude coordinate), a city block, a city name, a zip code, a state, a country, etc., based on the means used to determine the current location.

The system can then determine if a location-based service (e.g., a transport service, a delivery service, a food service, etc.), which can be requested by a user operating the service application on the mobile computing device, is available for use at the current location (330). In one example, the system can access a geography database of the service application that stores information about locations or geographic regions in which the location-based service is available. In another example, the system can communicate with, via the service application, the corresponding service arrangement system to provide a location query using the current location and to receive availability information regarding the current location. If the location-based service is unavailable at the current location, the system can cause a graphic icon corresponding to the service application, which would otherwise be displayed on a home page on a display of the mobile computing device, to be hidden so that the graphic icon is not displayed with the home page (340). The home page can then be displayed accordingly (350).

Figure 4A:
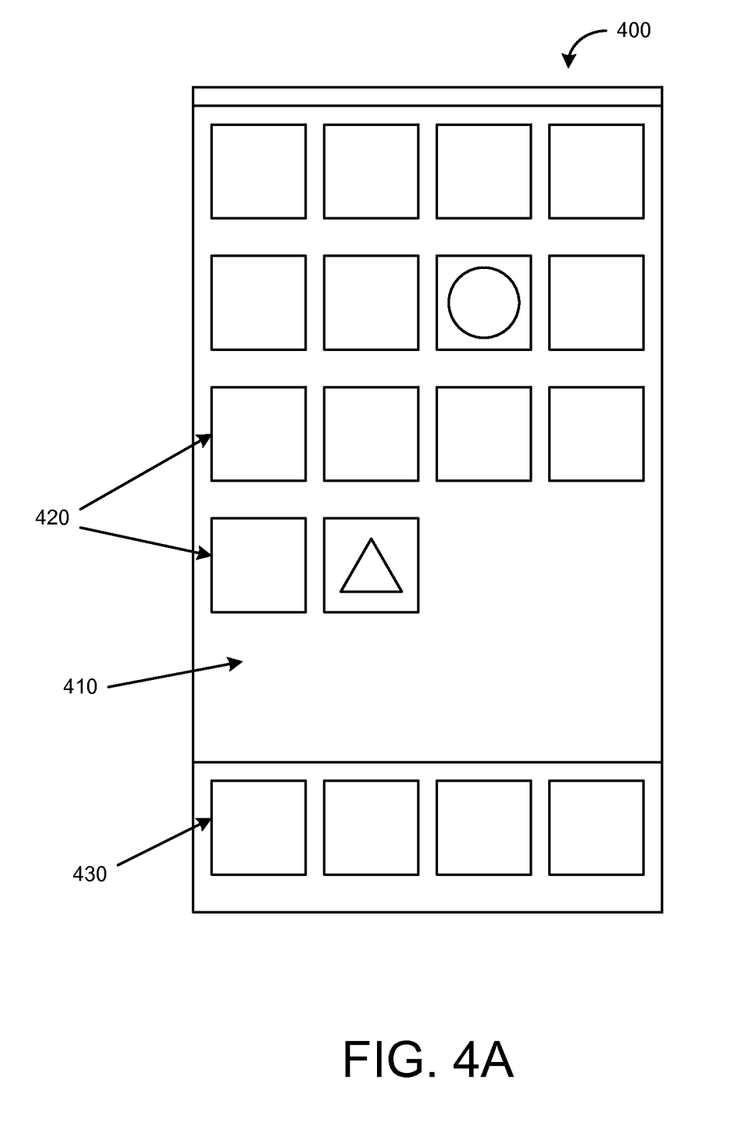
FIGS. 4A through 4C illustrate examples of user interfaces of a mobile computing device.
Figure 4B:
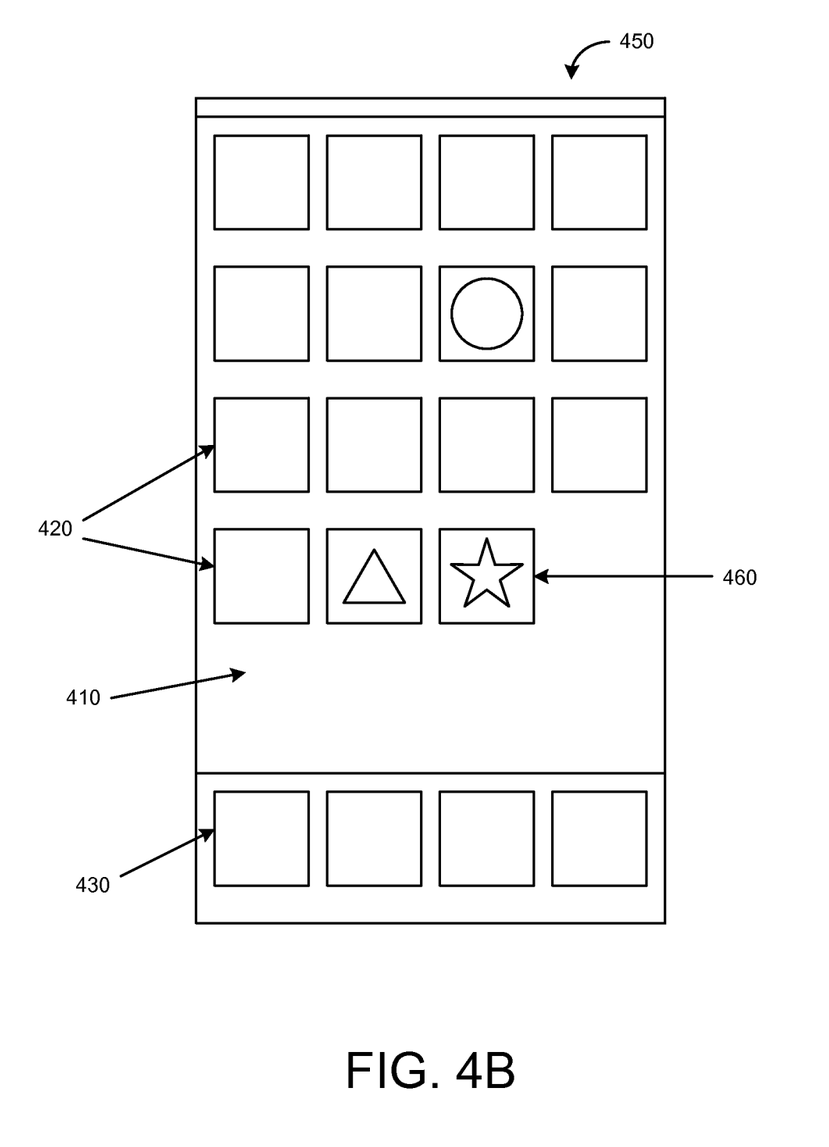

For example, referring to FIG. 4A, if the location-based service is unavailable at the current location, a home page (or launch user interface) 400 is displayed on a display of the mobile computing device with the graphic icon corresponding to the service application being hidden from view (e.g., the graphic icon 460 with the star can correspond to the service application, as seen in FIG. 4B, is not shown in FIG. 4A). The home page 400 can include a layout 410 having a plurality of graphic icons 420 corresponding to a plurality of other applications that are stored on the mobile computing device. The home page 400 can also include a set of graphic icons 430 in a separate region of the layout 410 (e.g., the application tray region) that are always displayed in examples where individual home pages of multiple home pages can be displayed in response to user input (e.g., a swipe gesture on a touch-sensitive display of the mobile computing device).

On the other hand, if the location-based service is available at the current location, the system can cause the graphic icon (e.g., the graphic icon 460) to be included in the home page 450 (345) and can display the home page on the display accordingly (350), such as illustrated in FIG. 4B. In FIG. 4B, the home page 450 can include the graphic icon 460 at the end or bottom of the group if displayed icons 420. However, in another example, the system can display the graphic icon 460 at a different position, such as shown in the home page 470 of FIG. 4C. Still further, in other examples, the system can cause the graphic icon 460 to be displayed in the application tray region of the home page of the mobile computing device.

Figure 4C:
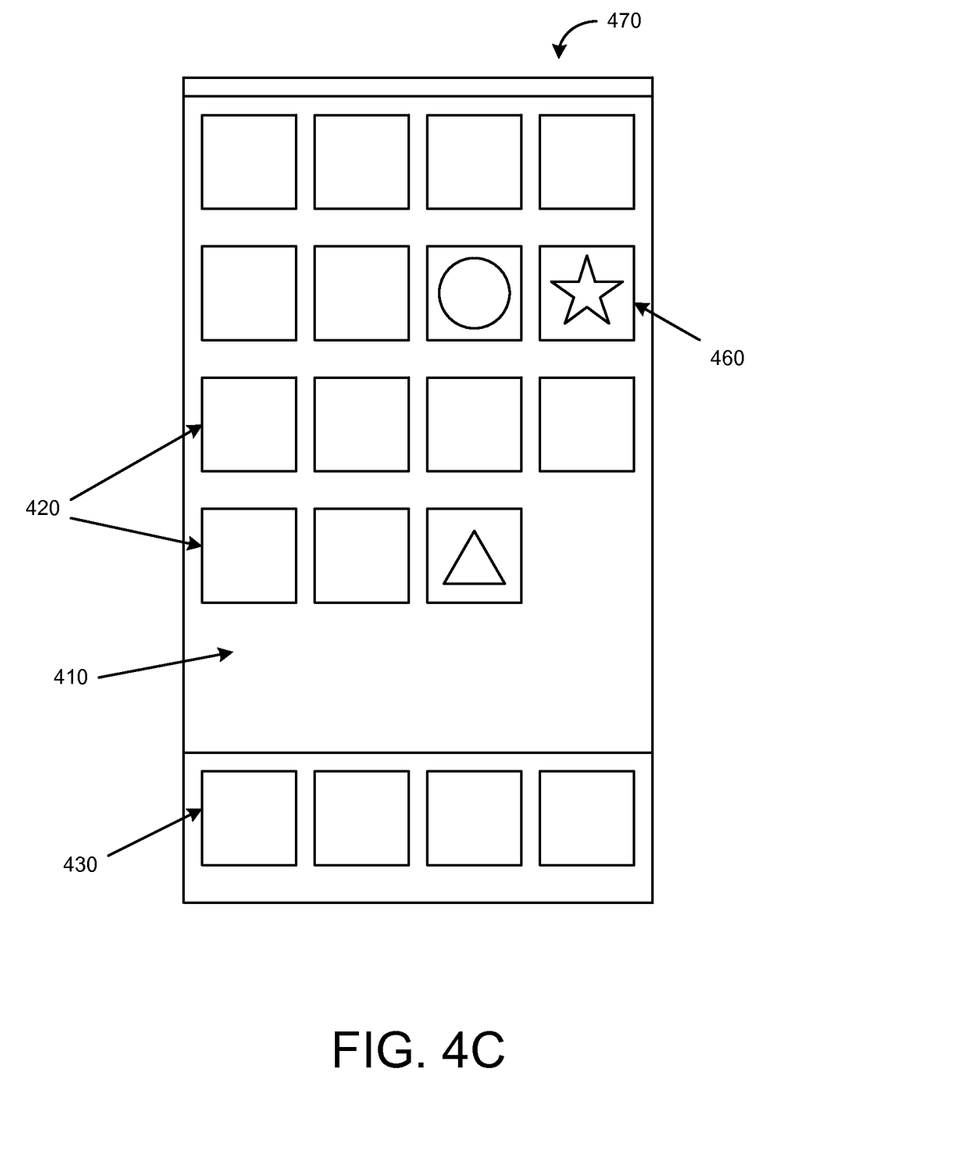

For example, if the user was previously at a location in which the location-based service was available at a first instance in time, the graphic icon 460 may have been included in the home page 470. The user may have positioned the graphic icon 460 at the particular position as illustrated in FIG. 4C. Such data about the position of the graphic icon 460 specified by the user can be stored in the system (e.g., the presentation component). If the user then moved to a location in which the location-based service was unavailable at a second, subsequent instance in time, the system may have dynamically adjusted the content of the home page so that the graphic icon 460 was no longer displayed, such as the home page 400 illustrated in FIG. 4A. At a third, subsequent instance in time, if the user again moved to a location in which the location-based service was available, the system (e.g., the presentation component) may access the previously stored data about the positions of the graphic icons, and display the graphic icon 460 at the position previously specified by the user, as illustrated in FIG. 4C.

As an addition or an alternative, in one example, if the location-based service is unavailable at the current location, the system can display the graphic icon but make the graphic icon not selectable by the user (e.g., make the graphic icon inoperable). Typically, the graphic icon, when displayed, can be selectable, so that selection of the icon by user input causes the system to launch or open (and display) the corresponding application. By making the graphic icon not selectable by user input, the user can be prevented from launching or opening the service application when the location-based service is unavailable at the user's current location.

Still further, according to some examples, the system can determine whether the user of the mobile computing device has previously used or operated the service application (or has previously made a request for and/or received a location-based service using the service application). The service application (and/or the system) can store data about the user, such as a user profile that includes user and/or device information, and store data about whether the user has previously used the service application. In such an example, when the system determines that a location-based service is unavailable at the current location of the mobile computing device, the system can also check the data in the service application to determine whether the user has previously used the service application. If the user has used the service application before, the system can enable the graphic icon corresponding to the service application to be displayed on the home page despite the location-based service being unavailable. As an addition or an alternative, the system can cause the graphic icon to be inoperable. If the user has not used the service application before, the system can cause the graphic icon to be hidden from view.

Figure 3B:
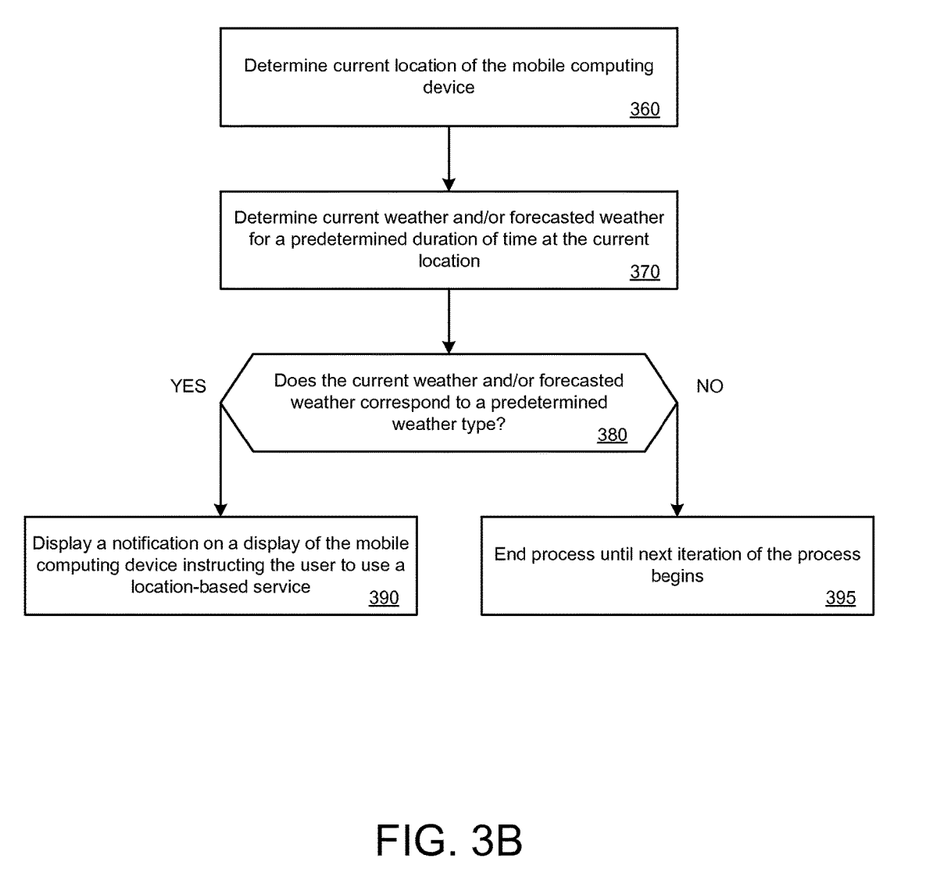

FIG. 3B illustrates another example method for dynamically controlling the presentation of a graphic feature based on location information. A method such as described by an example of FIG. 3B can be implemented using, for example, components described with an embodiment of FIG. 1 or an embodiment of FIG. 2. Accordingly, references made to elements of FIG. 1 or FIG. 2 are for purposes of illustrating a suitable element or component for performing a step or sub-step being described. In the example of FIG. 3B, the graphic feature can correspond to a notification message that is generated by an application running on a mobile computing device. In addition, in one example, the system implemented on the mobile computing device can perform operations corresponding to FIGS. 3A and 3B concurrently.

Referring to FIG. 3B, the system can determine the current location of a mobile computing device (360). The system can determine the current location in response to detecting a triggering event, such as described with respect to FIGS. 1 through 3A. In one example, the system can launch and run a weather application, such as a native weather application, which can determine the current location by receiving the location information from a GPS receiver or a transceiver of the mobile computing device. In the example described in FIG. 3B, the weather application can interface with a service application and/or communicate with a service arrangement system, such as described in FIGS. 1 and 2, or the service application can be integrated, in part, with the weather application.

The weather application can then determine the current weather at the current location and/or the forecasted weather for a predetermined duration at the current location (370). For example, the forecasted weather can be for a time period (e.g., one hour, three hours, eight hours, etc.) starting from the current instance in time or a time period starting at a later instance in time. The weather application can communicate with a remote network source to determine the current weather and/or the forecasted weather by making a query or call using the current location.

The weather application can determine whether the current weather and/or the forecasted weather corresponds to one of a plurality of predetermined weather types (380). In this example, a predetermined weather type may correspond to rain, showers, snow, hail, etc., or a threshold percentage chance of such weather types (e.g., weather types that would require a user to use the location-based service, such as transport service, food service, delivery service, etc.). If the current weather and/or the forecasted weather corresponds to one of the predetermined weather types, the weather application can display a notification or a message on a display of the mobile computing device (390).

The notification can instruct or notify the user to use the service application to request a location-based service, or to use the service application at a later time if the user plans to travel. In another example, the notification can also instruct the user to download the service application if the service application is not yet downloaded or installed on the mobile computing device, or provide promotional information that enables the user to receive a cost-benefit with regards to ordering the location-based service. In one example, the weather application can display the notification, provided that the location-based service is available at the current location (e.g., previously determined by the system). Referring back to FIG. 3B, if the current weather and/or the forecasted weather does not correspond to one of the predetermined weather types, the process can end until the next iteration of the method described in FIG. 3B begins (395).

Hardware Designs

Figure 5:
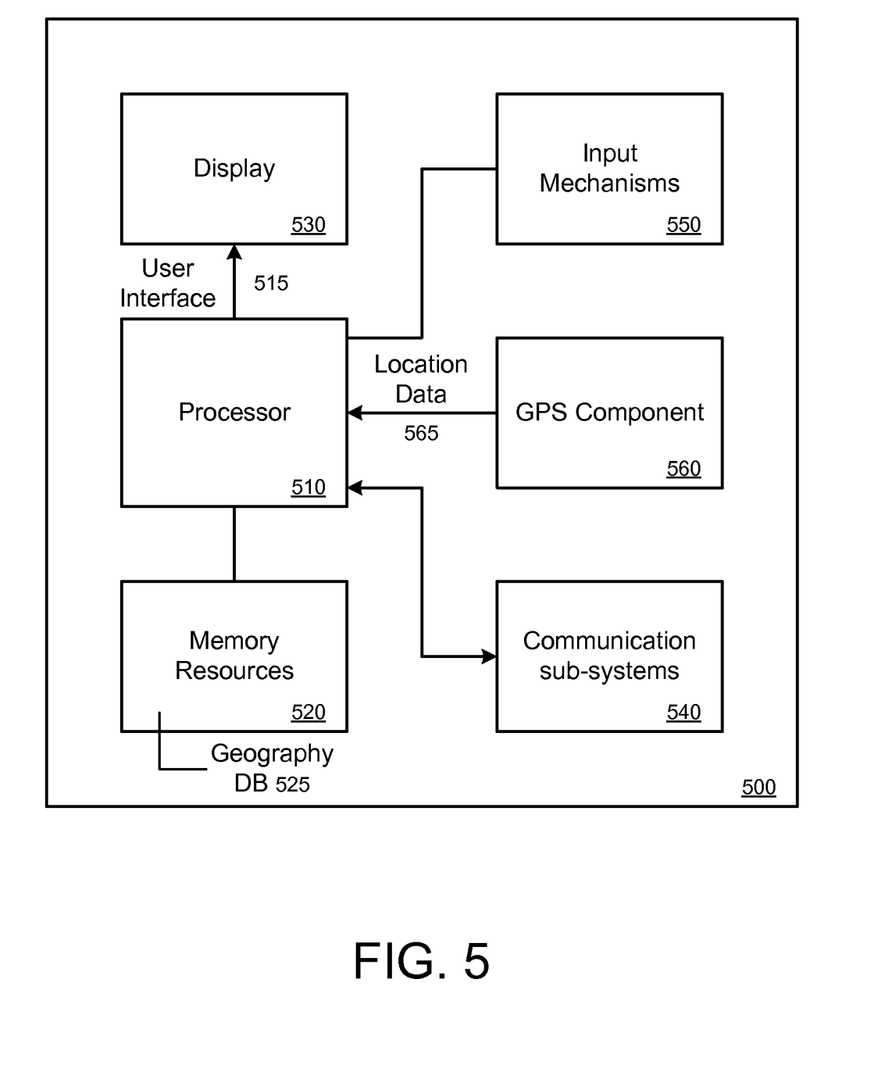
FIG. 5 is a block diagram that illustrates a mobile computing device upon which embodiments described herein may be implemented.

FIG. 5 is a block diagram that illustrates a mobile computing device upon which embodiments described herein may be implemented. In one embodiment, a computing device 500 may correspond to a mobile computing device, such as a cellular device that is capable of telephony, messaging, and data services. The computing device 500 can correspond to a client device or a driver device. Examples of such devices include smartphones, handsets or tablet devices for cellular carriers. The computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more location detection mechanisms (e.g., GPS component) 560. In one example, at least one of the communication sub-systems 540 sends and receives cellular data over data channels and voice channels. The communications sub-systems 540 can include a cellular transceiver and one or more short-range wireless transceivers.

The processor 510 can provide a variety of content to the display 530 by executing instructions stored in the memory resources 520. The memory resources 520 can store instructions for running the boot loader, instructions corresponding to the operating system, and one or more applications. For example, the processor 510 is configured with software and/or other logic to perform one or more processes, steps, and other functions described with implementations, such as described by FIGS. 1 through 4C, and elsewhere in the application. In particular, the processor 510 can execute instructions and data stored in the memory resources 520 in order to determine the current location of the mobile computing device and determine if a location-based service is available for use at the current location, as described in FIGS. 1 through 4C. Such instructions can be a part of a set of instructions corresponding to the operating system or can be a part of a set of instructions corresponding to a service application that can be used to make requests for location-based services. The processor 510 can also execute instructions for presenting a home page user interface (user interface 515) that includes a plurality of graphic icons corresponding to a plurality of stored application. Depending on whether the location-based service is available for use at the current location, the processor 510 can cause the graphic icon corresponding to the service application to be displayed with or hidden from the user interface 515.

In one example, the computing device 500 can determine a location data point 565 of the current location of the computing device 500 from the GPS component 560. In another example, the computing device 500 can determine the current location by using one or more transceivers or a GPS receiver of the communications sub-systems 540. While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A non-transitory computer-readable medium storing instructions that, when executed by a processor of a mobile computing device, causes the mobile computing device to:
   determine a current location of the mobile computing device, the current location being determined by using at least a global positioning system (GPS) receiver of the mobile computing device or a transceiver of the mobile computing device;
   determine, at a given instance, whether a location-based service, which can be requested by a user operating the mobile computing device, is available for use at the current location;
   in response to determining that the location-based service is unavailable for use, cause a graphic icon, that would otherwise be displayed on one of one or more home pages on a display of the mobile computing device, to be hidden so that the graphic icon is not displayed with any of the one or more home pages, wherein the graphic icon, when displayed, is selectable to cause a service application to access the location-based service;
   determine that the location-based service is available as a result of at least one of the mobile computing device changing the current location or a passage of time; and
   in response to determining that the location-based service is available, cause the graphic icon to be displayed in order to enable access to the location-based service through the service application;
   wherein the instructions are part of a set of instructions corresponding to the service application that is stored in the non-transitory computer-readable medium.

2. The non-transitory computer-readable medium of claim 1, wherein the instructions are executed in response to an operating system being initiated on the mobile computing device.

3. The non-transitory computer-readable medium of claim 1, wherein the instructions are executed in response to an operating system activating a cellular transceiver of the mobile computing device.

4. The non-transitory computer-readable medium of claim 1, wherein the instructions cause the mobile computing device to determine the current location of the mobile computing device by receiving information about the current location from a second application that is being operated on the mobile computing device, the second application having determined the current location using the GPS receiver or the transceiver.

5. The non-transitory computer-readable medium of claim 1, wherein the instructions cause the mobile computing device to determine the current location of the mobile computing device by receiving information about the current location from the GPS receiver, the GPS receiver determining the information about the current location in response to an operating system being initiated on the mobile computing device.

6. The non-transitory computer-readable medium of claim 1, wherein the instructions cause the mobile computing device to determine the current location of the mobile computing device by receiving information about the current location from the transceiver, wherein the transceiver corresponds to a cellular transceiver or a wireless network transceiver.

7. The non-transitory computer-readable medium of claim 1, wherein the instructions cause the mobile computing device to determine whether the location-based service is available at the current location by determining whether the current location is located in one or more predetermined geographic regions specified in a location database, the location database being stored with the set of instructions.

8. The non-transitory computer-readable medium of claim 1, wherein the instructions cause the mobile computing device to determine whether the location-based service is available at the current location by (i) transmitting, over one or more networks using a transceiver of the mobile computing device, information about the current location to a remote server, and (ii) receiving, from the remote server, availability information about the location-based service.

9. A mobile computing device comprising:
a display device;
a global positioning system (GPS) receiver;
a transceiver;
a processor; and
a memory storing instructions that, when executed by the processor, causes the mobile computing device to:
determine a current location of the mobile computing device, the current location being determined by using at least the GPS receiver or the transceiver;
determine, at a given instance, whether a location-based service, which can be requested by a user operating the mobile computing device, is available for use at the current location;
in response to determining that the location-based service is unavailable for use, cause a graphic icon, that would otherwise be displayed on one of one or more home pages on the display, to be hidden so that the graphic icon is not displayed with any of the one or more home pages, wherein the graphic icon, when displayed, is selectable to cause a service application to access the location-based service;
determine that the location-based service is available as a result of at least one of the mobile computing device changing the current location or a passage of time; and
in response to determining the location-based service is available, cause the graphic icon to be displayed in order to enable access to the location-based service through the service application.

10. The mobile computing device of claim 9, wherein the instructions are executed by the processor as part of a boot-up process of the mobile computing device, the boot-up process being completed when one of the home pages are displayed on the display.

11. The mobile computing device of claim 9, wherein the transceiver corresponds to a cellular transceiver, wherein the display corresponds to a touch-sensitive display, and wherein the instructions are executed by the processor in response to the user providing input, via the touch-sensitive display, to change an operational setting of the mobile computing device from a first setting in which the cellular transceiver is disabled to a second setting in which the cellular transceiver is enabled.

12. The mobile computing device of claim 9, wherein the memory stores a set instructions corresponding to a second application, and wherein the instructions cause the mobile computing device to determine the current location of the mobile computing device by receiving information about the current location from the second application that is being operated on the mobile computing device.

13. The mobile computing device of claim 9, wherein the instructions cause the mobile computing device to determine the current location of the mobile computing device by receiving information about the current location from the GPS receiver, the GPS receiver determining the information about the current location in response to an operating system being initiated by the processor.

14. The mobile computing device of claim 9, wherein the instructions cause the mobile computing device to determine whether the location-based service is available at the current location by determining whether the current location is located in one or more predetermined geographic regions specified in a location database, the location database being stored with the instructions.

15. The mobile computing device of claim 9, wherein the instructions cause the mobile computing device to determine whether the location-based service is available at the current location by (i) transmitting, over one or more networks using a transceiver of the mobile computing device, information about the current location to a remote server, and (ii) receiving, from the remote server, availability information about the location-based service.

16. A method of operating a mobile computing device, the method comprising:
detecting that input has been provided via an input mechanism of the mobile computing device to power on the mobile computing device from an off state;
in response to detecting the input, initiating a boot-up process of the mobile computing device, including initiating an operating system of the mobile computing device;
after initiating the operating system, determining a current location of the mobile computing device, the current location being determined by using at least a global positioning system (GPS) receiver of the mobile computing device or a transceiver of the mobile computing device;
determining, at a given instance, whether a location-based service, which can be requested by a user operating the mobile computing device, is available for use at the current location;
in response to determining that the location-based service is unavailable for use, causing a graphic icon, that would otherwise be displayed on one of one or more home pages on a display of the mobile computing device, to be hidden so that the graphic icon is not displayed with any of the one or more home pages, wherein the graphic icon, when displayed, is selectable to cause a service application to access the location-based service;
determining that the location-based service is available as a result of at least one of the mobile computing device changing the current location or a passage of time; and in response to determining that the location-based service is available, causing the graphic icon to be displayed in order to enable access to the location-based service through the service application;

wherein the service application is stored in a memory of the mobile computing device.

17. The method of claim 16, wherein determining the current location includes receiving information about the current location from a second application that is being operated on the mobile computing device, the second application corresponding to a native application associated with the operating system and having been initiated after initiating the operating system.

18. The method of claim 16, wherein determining the current location includes receiving information about the current location from the GPS receiver, the GPS receiver determining the information about the current location in response to an operating system being initiated on the mobile computing device.

19. The method of claim 16, wherein determining whether the location-based service is available at the current location includes determining whether the current location is located in one or more predetermined geographic regions specified in a location database, the location database being stored with the service application.

20. The method of claim 16, wherein determining whether the location-based service is available at the current location includes (i) transmitting, over one or more networks using a transceiver of the mobile computing device, information about the current location to a remote server, and (ii) receiving, from the remote server, availability information about the location-based service.

* * * * *